US007559755B2

(12) United States Patent
Baltruschat et al.

(10) Patent No.: US 7,559,755 B2
(45) Date of Patent: Jul. 14, 2009

(54) PRESS

(75) Inventors: Udo Baltruschat, Pinneberg (DE); Holger Behns, Barsbuttel (DE); Carsten Jordt, Geesthacht (DE); Jan Naeve, Schattin (DE); Thomas Pannewitz, Klein Pampau (DE); Martin Plucinski, Asendorf (DE); Harald Romer, Reinbek (DE)

(73) Assignee: Fette GmbH, Schwarzenbek (DE)

( * ) Notice: Subject to any disclaimer, the term of this patent is extended or adjusted under 35 U.S.C. 154(b) by 287 days.

(21) Appl. No.: 11/734,530

(22) Filed: Apr. 12, 2007

(65) Prior Publication Data

US 2007/0251369 A1 Nov. 1, 2007

(30) Foreign Application Priority Data

Apr. 29, 2006 (EP) .................................. 06009003

(51) Int. Cl.
*B29C 43/04* (2006.01)

(52) U.S. Cl. ......................... 425/78; 425/355; 425/359; 425/415; 425/423

(58) Field of Classification Search ................... 425/78, 425/352–355, 359, 410–412, 415, 423
See application file for complete search history.

(56) References Cited

U.S. PATENT DOCUMENTS 3,013,321 A 12/1961 McElroy ........................ 25/41
4,134,716 A * 1/1979 John, Jr. ...................... 425/352
4,260,346 A * 4/1981 Anderson et al. ............. 425/78
5,580,586 A * 12/1996 Yokoyama .................. 425/355
7,229,263 B2 * 6/2007 Silbermann et al. ......... 425/414

FOREIGN PATENT DOCUMENTS

| | | |
|---|---|---|
| DE | 1 427 454 | 2/1969 |
| DE | 1 679 915 | 3/1971 |
| DE | 1 627 919 | 7/1971 |
| DE | 7202076 | 11/1972 |
| DE | 31 42 126 A1 | 5/1983 |
| DE | 86 04 425 | 6/1986 |
| DE | 38 42 914 | 1/1989 |
| DE | 103 00 722 B3 | 4/2004 |
| DE | 102 54 656 A1 | 6/2004 |
| EP | 1 422 050 | 5/2004 |
| EP | 1 625 933 A2 | 2/2006 |

* cited by examiner

*Primary Examiner*—James Mackey
*Assistant Examiner*—Thu Khanh T Nguyen
(74) *Attorney, Agent, or Firm*—Vidas, Arrett & Steinkraus, P.A.

(57) ABSTRACT

A press for the manufacture of dimensionally stable compacts from powdered material, characterized by the features of a press frame having vertically adjustable columns and cross-connections, a die retainer plate, at least one upper ram retaining plate, at least one lower ram retaining plate, a guide column outside a press main axis which has two parallel guideways on which all retainer plates are adapted to be guided vertically on one side or be selectively locatable, wherein the lower end of the guide column is fixedly coupled to a frame-mounted lower plate and the upper end is located on the press frame, an upper adjustable drive adapted to be located on the press frame, for the upper retaining plate (34), a lower adjustable drive (68) for the lower retaining plate (38, 40) and the die retainer plate, if desired, and which is fixed to the frame-mounted lower plate.

13 Claims, 5 Drawing Sheets

PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Presses for the manufacture of dimensionally stable pressed blanks from powdered material generally have a die, at least one upper ram and at least one lower ram which compact the powdered material in the cavity of the die from opposed sides. For example, the upper and lower rams are coupled to the slide and piston rod of a hydraulic cylinder that are mounted on the press frame. The powdered material is fed to the die bore by means of a suitable filling device where the position of the lower ram normally predetermines the filling height or filling volume. After the material is compressed the compact is removed from the die bore.

Presses of this type use different designs. So-called single-sided presses have stationary lower rams and dies. Double-sided presses move the die either floatingly or forcibly with the lower ram being fixed in place or movable. The so-called expulsion method or the withdrawal method is employed to demould the compact. The expulsion method involves moving the compact out of the stopped die by means of the lower ram whereas the lower ram is stationary and the die is moved in the withdrawal method.

Normally, the compression tools are not mounted directly on the adjustable drives, but are via adaptors. Thus, for instance, the die is clamped on a die retainer plate which, if movable, is coupled in turn to an adjustable drive by means of force-transmitting elements. The same applies to the upper and lower rams which are mounted on appropriate retainer plates. This allows to incorporate different compression tools in an existing press.

In the state of the art, a press of the type described is designed according to which demoulding principle is adopted. A conversion to the respective other demoulding principle normally is out of consideration.

The control or regulation of a compression procedure requires that at least two parameters should be known. On one hand, the compression force is measured to determine the maximum force by which the powder is compressed. In case of need, however, the run of the compression force of tools over the path or over time during the compression procedure is helpful as well. A further parameter is the position of the upper and lower rams with regard to a reference which usually is constituted by the upper edge of the die. It is known that influences by temperature and the compression forces result in length variations to the press frame, force-transmitting elements, and tools. Although the position of tools may be measured via their adaptors by means of suitable measuring systems the determinations of positions are not sufficiently precise unless a correction is made thereto via the respective temperature and compression force. Apart from this, there is a risk of the measuring systems themselves or their holder experiencing temperature-dependent end even compression force-dependent deformations and, therefore, induce inaccuracies in measurements.

From DE 102 54 656 B4, the entire contents of which is incorporated herein by reference, a typical hydraulic press has become known in which a die retainer plate and a plurality of ram carriers (adaptors) are variably mounted in the press frame via hydraulic drives. The known press provides for supporting devices which support the ram carriers at a press end position relative to the basic body of the press frame. DE 3142126 B1, the entire contents of which is incorporated herein by reference, has made known a press for the manufacture of stepped, dimensionally stable powder-based compacts from a ceramic material in which seating plates which carry lower rams are all movable hydraulically from a base plate and, in the press end position, rest as seating plates on adjustable mechanical stops of the base plate. The seating plates can be moved upwardly together by steps for the expulsion of the compacts after the withdrawal of the die and release of the compact's circumferential surface contacting the die up to the respective release of the next contact surface. In the press end positions defined by fixed stops, the counterforce or supporting force is generated by mechanical stops in either press.

From DE 103 00 722 B3, the entire contents of which is incorporated herein by reference, a press has become known in which an upper carriage and a lower carriage are guided vertically for the mounting an upper slide and a lower slide. The guide column is attached to a frame table on which also the die retainer plate is mounted. A no-wear guidance of the retainer plates is performed by the fact that the carriages are joined to the hydraulic drive via an angle balancing element and a lateral compensation element.

It is the object of the invention to provide a press for the manufacture of dimensionally stable compacts from powdered material that can easily be adapted to the desired removal/demoulding of the compact from the die bore and which further allows for a low-error determination of the positions of tools.

BRIEF SUMMARY OF THE INVENTION

In the inventive press, a guide column is disposed outside a press main axis which has two parallel guideways on which all retainer plates are guided vertically on one side. The retainer plates are adapted to the guideways, which preferably extend along guide rails, such that the support of one guideway defines the reference side and that of the other one defines the follow-up side to provide for the precision required. According to an aspect of the invention, the guideways are dovetailed in cross-section.

At its lower end, the guide column is fixedly seated on a frame-mounted plate to which preferably the lower adjustable drive is coupled as well whereas the upper end is joined to the press frame, wherein the column is fixed only in a horizontal direction, according to an aspect of the invention. The press frame is known to absorb the compression forces while undergoing a more or less marked change to its shape, as a result. However, this does not affect the guide column if it is fixed only horizontally at the upper end while the vertical direction allows for a relative movement between the guide column and press frame in order to keep thermally induced or compression force-induced deformations away from the guide column.

In a press of the inventive construction, the compact may be removed by the expulsion or withdrawal procedures with no need to exchange the retainer plates. It will be dependent on the mode of press operation which of the retainer plates to couple to the lower and upper adjustable drives and which plate to fix in place. Fixed stops are unnecessary because the counterforce may be applied by the associated adjustable drive, e.g. a hydraulic cylinder. In case the die retainer plate is movable during the withdrawal procedure a passage hole has to be provided for the lower ram in the retainer plate in order that elements transmitting forces from the adjustable drive may be coupled to the die retainer plate. Therefore, it is necessary to incorporate such force-transmitting elements during a conversion from the expulsion mode to the withdrawal mode. However, the respective effort is relatively small. If two or more retainer plates require to be provided for multiple lower rams it is understood that all retainer plates, except for the upper one, have to possess through openings to allow force-transmitting elements to pass to the respective overlying retainer plate.

As mentioned before, fixed stops may be omitted in the inventive press. Since the supporting forces possibly are significant and need to be absorbed by the hydraulic system the system requires to be designed accordingly. Fixed stops will reduce the expenditure for the hydraulic system. Therefore, according to an aspect of the invention, it may be beneficial if supporting columns are supported rotatably about a vertical axis on opposed sides of the retainer plate within the press frame or on the bearing plate which, at the upper end, have laterally overhanging supporting portions which selectively can be pivoted below the die retainer plate by rotating the supporting column. Fixed stops for the die-plate will be possible in such case. It is possible to vary the height level of the die retainer plate and, hence, that of the die and, thus the height of withdrawal for the compacts by varying the height of the supporting portions. If any fixed stops are dispensed with, it is understood that the height of the individual retainer plates and that of the die retainer plate may be adjusted arbitrarily.

To avoid troublesome deformations, specifically keep forces away from the guide surface, efforts should be made to orient the adjusting axes of the upper and lower adjustable drives precisely with respect to each other. According to an aspect of the invention a suggestion is made here that the upper adjustable drive be seated positively in an upper bearing plate which, in turn, is bolted to an upper coupling plate of the press frame. The upper end of the guide column has connected thereto an alignment plate and the bearing plate and alignment plate are adapted to be locatable horizontally to each other via a positive locking joint. The lower adjustable drive is disposed positively within a lower bearing plate, the guide column being supported on the lower bearing plate. Since the guide column is coupled to the lower bearing plate the guide column constitutes an entity with the hydraulic drive. Now, if the upper bearing plate with the adjustable drive seated therein is aligned with the alignment plate this ensures the coincidence of the vertical axes of the drives. According to an aspect of the invention, this may be achieved, for example, by the bearing plate and alignment plate having at least some bores orientable towards each other for the reception of an alignment pin. It is preferred to provide two pairs of bores and two alignment pins. They take care that the upper bearing plate be adjusted with the upper adjustable drive before the upper bearing plate is located on the coupling plate and, hence, the press frame. Thus, coupling is done in the upper area exclusively in a horizontal plane whereas a relative movement remains possible between the press frame, on one hand, and the guide column, on the other, in a vertical direction in order to prevent compression force-dependent and temperature-conditioned expansions of the press frame from being transmitted to the guide and retainer plates, as was mentioned before.

Supporting columns of a press frame usually are arranged in a rectangle or square. For such press frame of this type, an aspect of the invention provides that the guide column be disposed in a corner area of the rectangle or square at the inside of the associated frame column. This increases flexibility with regard to horizontal cross-motions at a die level, and the accessibility of the die. Hence, this makes unnecessary through openings in the frame for the filling axis or further transverse axes.

As mentioned above, a determination of positions for compression tools is of significance for the monitoring and control of press operation. Therefore, an aspect of the invention provides that a single graduated strip be mounted on the guide column where the number of measuring carriages which interact with the graduated strip matches the number of retainer plates. According to a further aspect of the invention, the graduated strip is mounted only in one reference plane of the pressing tools which preferably is defined by the clamping plane of the die or die upper edge.

Several measuring systems are provided for the individual tools in the state of the art. The thermally fixed point is located in the centre each of the length measuring systems. This results in a change to the direction of longitudinal extension when the measuring carriage traverses this fixed point. Since the longitudinal extension additionally is impaired by the mounting to which the length measuring systems are attached the invention minimizes the impact of deformations by temperature and compression on the results measured.

The invention achieves a series of advantages. The assembly of the guide column creates a freely accessible press space. The inventive press helps in implementing both the expulsion and withdrawal procedures. The die plane and withdrawal level may be varied within limits. The individual retainer plates exhibit identical behaviours amongst themselves by presenting the same deformations because of the same seatings. Vertical forces acting on the guide column are not encountered. The seating of the retainer plates is uncoupled from the press frame, by which fact deformations of the press frame by compression forces and/or temperature do not directly affect the seating of the retainer plates.

BRIEF DESCRIPTION OF THE SEVERAL VIEWS OF THE DRAWINGS

The invention will be described in more detail below with reference to the embodiments shown in the drawings.

DETAILED DESCRIPTION OF THE INVENTION

Figure 1:
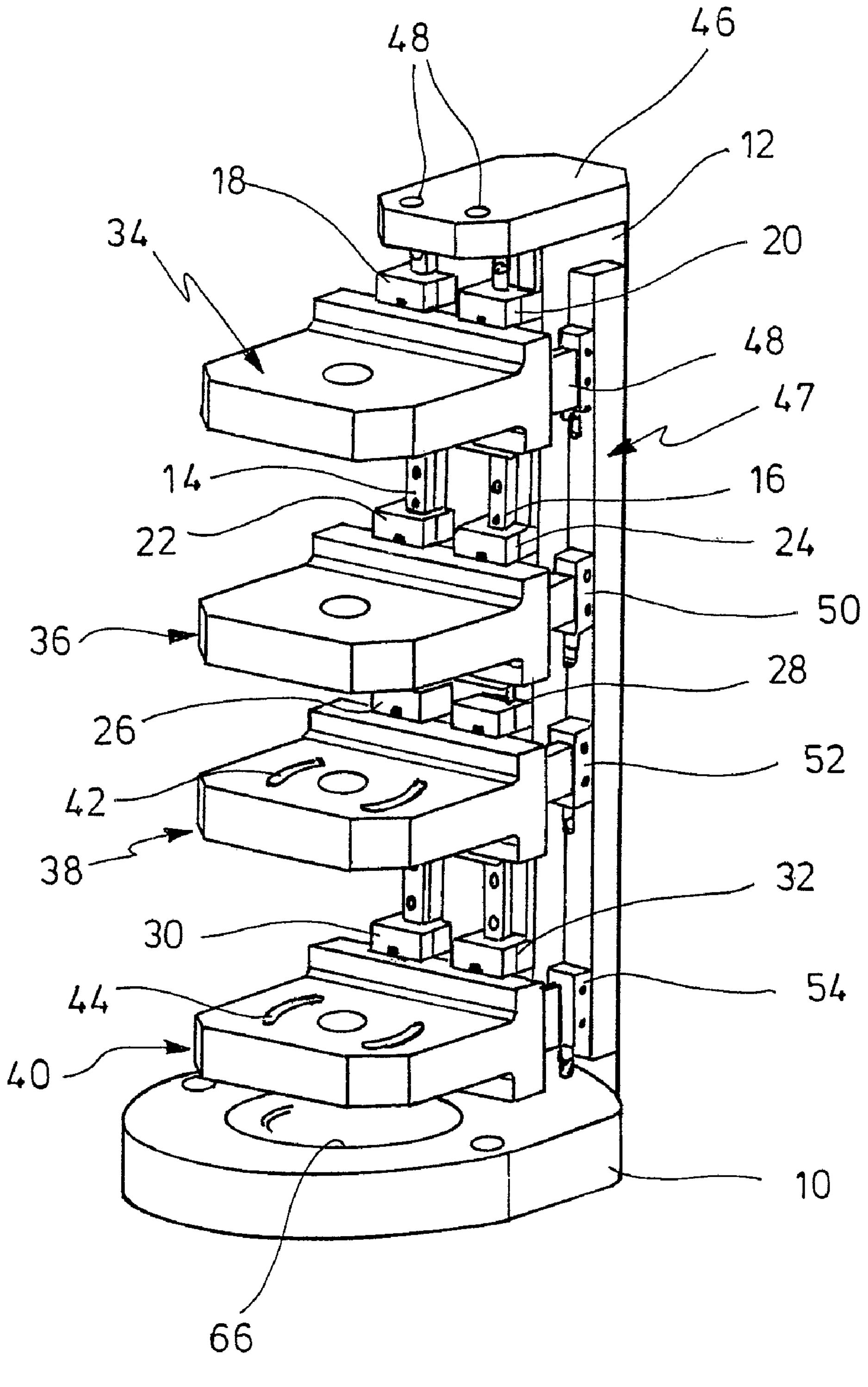
FIG. 1 shows a perspective view of the structure of a bearing for the retainer plates of a hydraulic press with no press frame or hydraulic drives, FIG. 2 schematically shows a section through the structure of FIG. 1 with the press frame and the upper and lower hydraulic drives contoured, FIG. 3 schematically shows a plan view of the assembly of FIG. 2.

While this invention may be embodied in many different forms, there are described in detail herein a specific preferred embodiment of the invention. This description is an exemplification of the principles of the invention and is not intended to limit the invention to the particular embodiment illustrated FIG. 1 allows to see a bearing plate 10 which has supported thereon a guide column 12 of an essentially rectangular or square cross-section. The guide column 12 preferably is of a single-piece shape and may also be configured integrally with the bearing plate 10.

One side of the guide column 12 has mounted thereon two parallel guide rails 14, 16, preferably by means of a bolted joint, which are of a dovetailed cross-sections. The vertical parallel guide rails 14, 16 support guide carriages 18, 20, 22, 24, 26, 28, and 30, 32 which are attached to horizontal, axially spaced retainer plates 34 to 40. The retainer plates substantially are of the same construction and are of a T shape in their sections. The upper retainer plate 34 serves for mounting an upper ram (not shown), the retainer plate 36 is a die retainer plate and serves for mounting a die, and the lower retainer plates 38, 40 serve for mounting lower rams. The retainer plates 34 to 40 may be coupled to an upper and lower hydraulic drive, which is not shown in FIG. 1, for a vertical shift along the guide rails 14, 16. Reference thereto will be made farther below. The lower retainer plates 38, 40 have through openings 42, 44 to pass through force-transmitting elements of a lower hydraulic drive to the respective overlying retainer plate, i.e. the die retainer plate 36 or retainer plate 38, in the present case.

A horizontal alignment plate 46 which has two bores 48 near the free end, is fastened to the upper end of the guide column 12.

The side of the guide column 12 which is right-hand in FIG. 1 has mounted thereon a graduated strip 47 on which measuring carriages 48, 50, 52, 54 slide. The measuring carriages 48 to 54 are coupled each to a retainer plate 34 to 40 or are in an active communication therewith. The measuring carriages 48 to 54 and the graduated strip 47 assist in determining the position of the retainer plates 34 to 40 and, hence, the position of the compression tools which are not shown.

Figure 2:
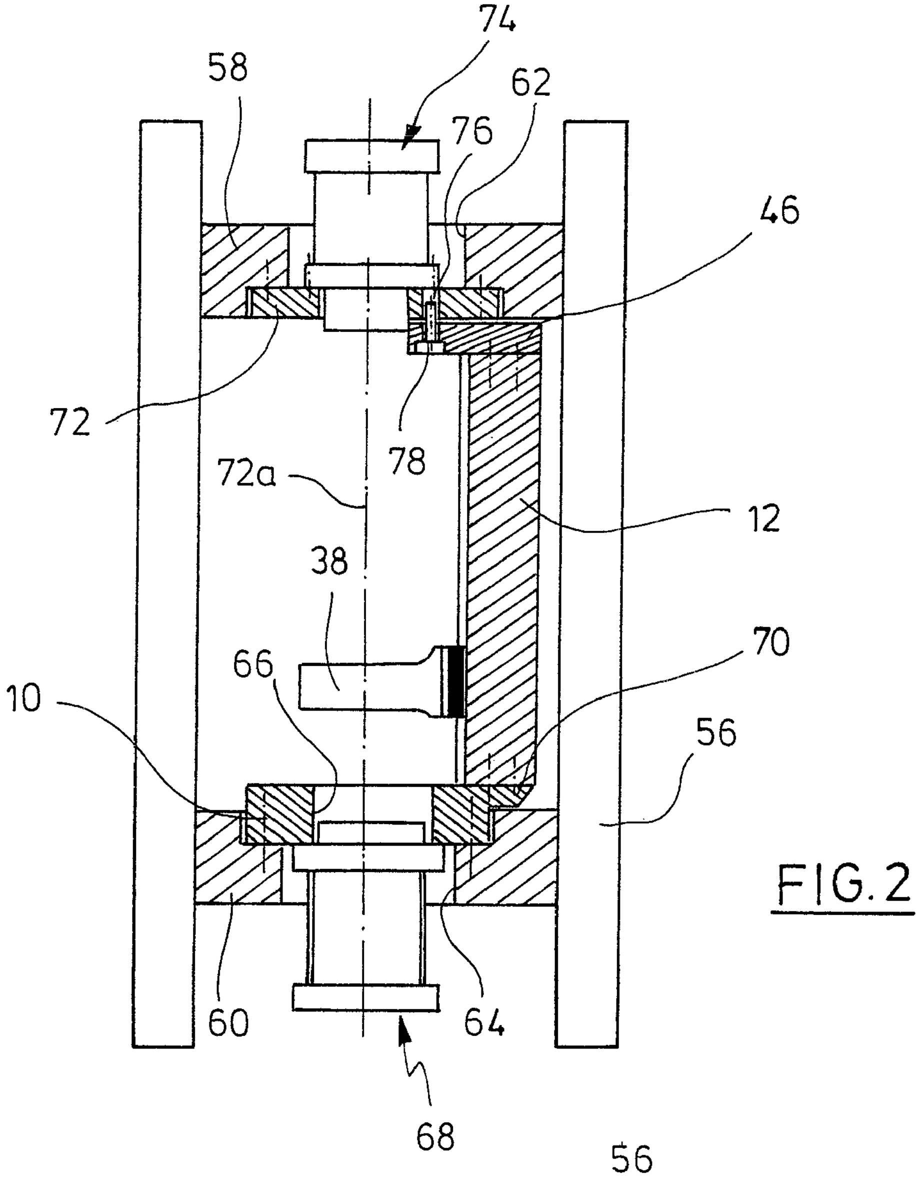

The assembly of the unit shown in FIG. 1 is shown in a press frame in FIG. 2.

Figure 3:
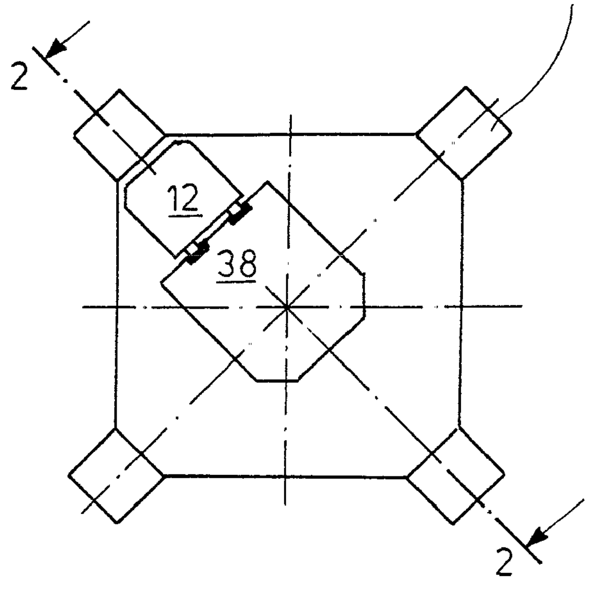

As emerges from FIGS. 2 and 3 the press frame has four frame columns 56 arranged in a square, which are connected to each other by an upper coupling plate 58 in the upper area and a coupling plate 60 in the lower area. The coupling plates 58, 60, which extend horizontally, have circular through openings 62 and 64, respectively.

The lower bearing plate 10 has a circular aperture 66 which has positively inserted therein a lower hydraulic drive 68. The bearing plate 10 is bolted inside the through opening of the coupling plate 60. The guide column 12 is supported on a radial lug 70 of the bearing plate 10 and is bolted thereto. Only one retainer plate each is outlined in FIGS. 2 and 3, e.g. the retainer plate 38 for a lower ram. An upper retainer plate 72 positively accommodates an upper hydraulic drive 74. The bearing plate 72 may be bolted inside a recess of the upper coupling plate 58. The bearing plate 72 has two bores, one of which is shown at 76. They can be aligned towards the bores 48 of the alignment plate 46. The pair of bores allows to put through alignment pins one of which is shown at 78 of FIG. 2. This makes it possible to position the bearing plate 72 horizontally with respect to the alignment plate 46 and, thus, also cause the axis of the upper hydraulic drive 74 to become flush with the axis of the lower hydraulic drive 68, which helps achieve a common vertical axis 72*a*. A relative movement may be admitted in a vertical direction between the guide column 12 and the frame, represented by the columns 56 and coupling plates 60, 58 here.

Figure 4:
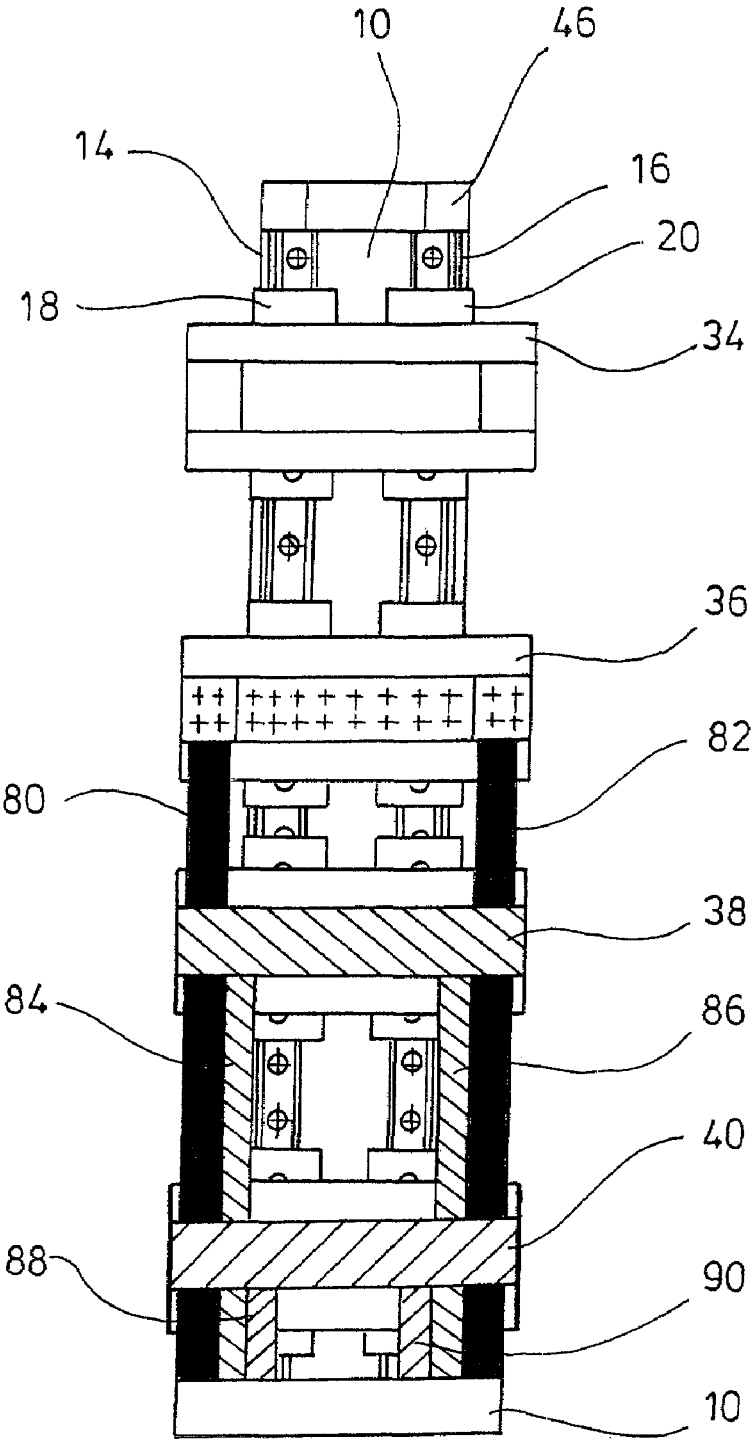
FIG. 4 shows a longitudinal section through FIG. 1 with force-transmitting elements for the individual retainer plates contoured additionally.

The assembly of force-transmitting elements for the retainer plates 36 to 40 is outlined in FIG. 4. For the retainer plate 36, force-transmitting elements 80, 82 extend from the hydraulic cylinder, not shown, on the bearing plate 10, which then pass through the retainer plates 38, 40 through the through openings 42, 44 shown in FIG. 1. Force-transmitting elements 84, 86 extend through the lower retainer plate 40 through the through openings 44 for operating the retainer plate 38 for a lower ram. The lower retainer plate 40 finally is actuated via force-transmitting elements 88, 90. As is apparent, therefore, the retainer plates 36 to 40 may be actuated arbitrarily relative to each other or be maintained in position. An actuation of the upper retainer plate 34 for the upper ram is not illustrated.

Figure 5:
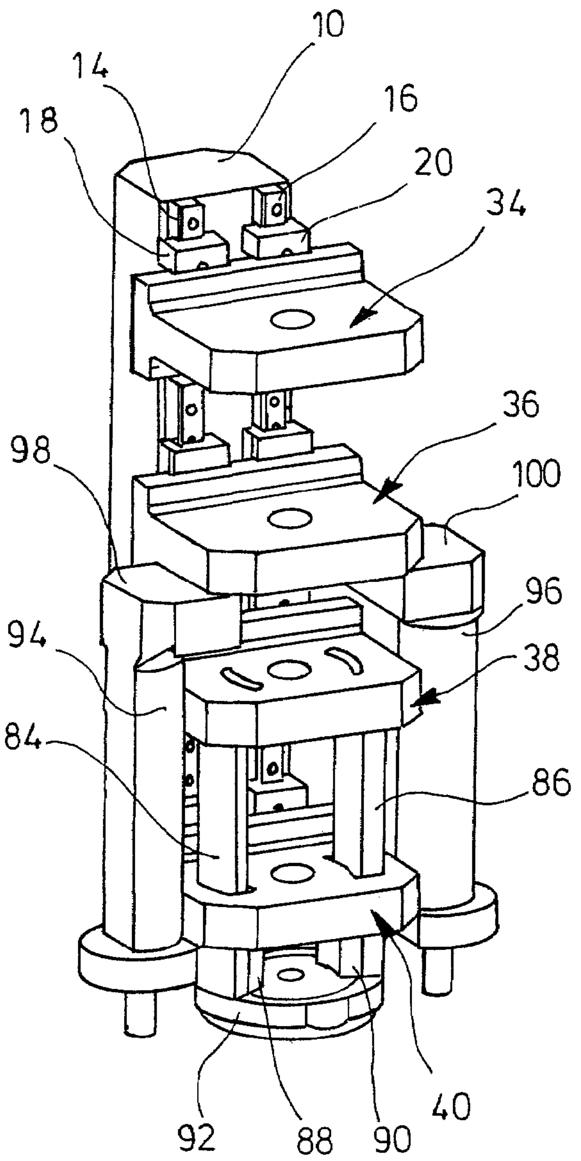
FIG. 5 shows a feasible embodiment of FIG. 1 for the expulsion procedure.
Figure 6:
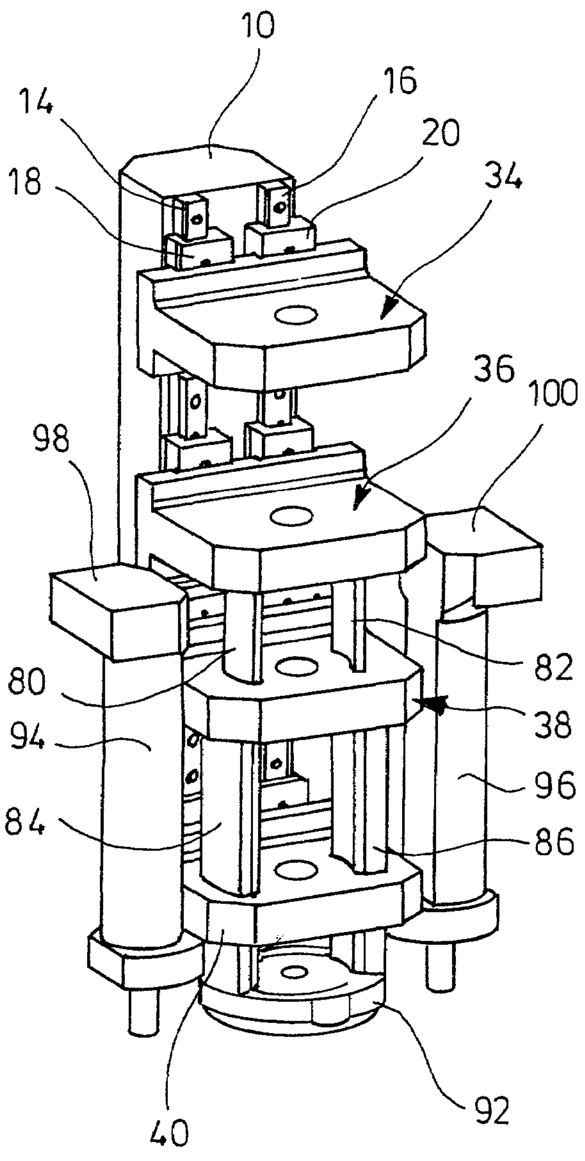
FIG. 6 shows the operational mode of the assembly of FIG. 4 for the withdrawal procedure, FIG. 7 schematically shows a representation similar to FIG. 2 including a position measuring system.

It is understood that the die retainer plate 36 may also be kept in position by mechanical means, as are illustrated in FIGS. 5 and 6, if an expulsion procedure is intended. Force-transmitting elements 80, 82 may be omitted in this case.

The unit of FIG. 1 is illustrated also in a substantially perspective view in FIGS. 5 and 6. Therefore, components have the same reference numbers in FIGS. 5 and 6 as far as they are identical to those of FIG. 1.

In FIGS. 5 and 6, the bearing plate 10 is omitted and the upper end of the upper hydraulic drive is outlined at 92 instead. Moreover, the force-transmitting elements for the retainer plates 36 to 40 are outlined in agreement with FIG. 4. For the test, the pair of force-transmitting elements 88, 90 for the lower retainer plate 40 is omitted in FIG. 6.

Further, FIGS. 5 and 6 show supporting columns 94, 96 which, at the lower end, are rotatably supported about a vertical axis in the press frame or on the bearing plate 10 in a manner which is not illustrated in detail. At the upper end, they present supporting portions 98, 100 which are configured such that the die retainer plate 36 is supported in one rotational position of FIG. 5 and, thus, bears against a fixed stop downwardly whereas the die retainer plate 36 is freely movable in the embodiment of FIG. 6. Thus, FIG. 5 shows an assembly for the expulsion procedure with the die retainer plate 36 fixed whereas the withdrawal procedure may be realized in FIG. 6. In this case, one or the two of the retainer plates 38, 40 may be stationary, which is practiced either by means of the lower hydraulic drive or also by a mechanical support.

Figure 7:
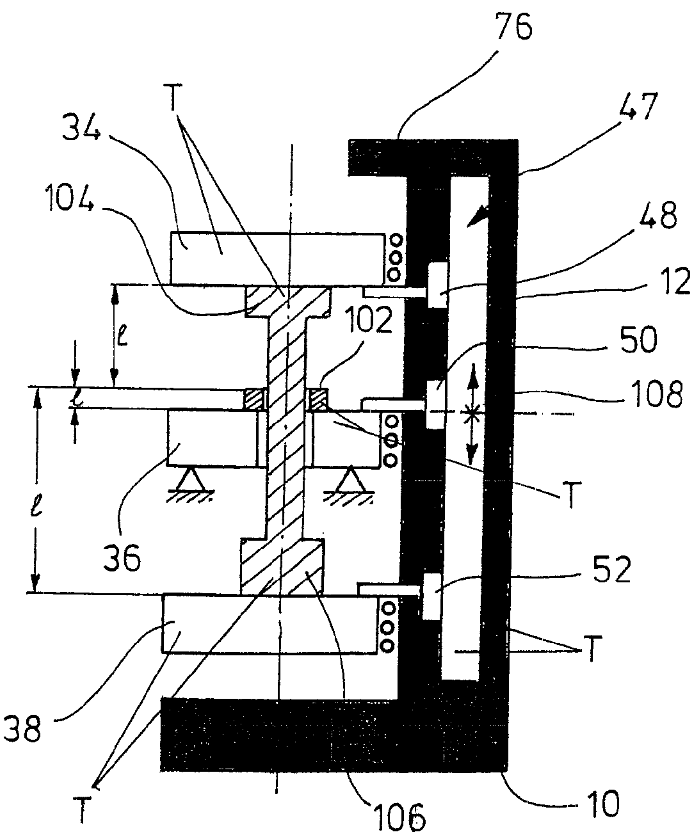
Figure 8:
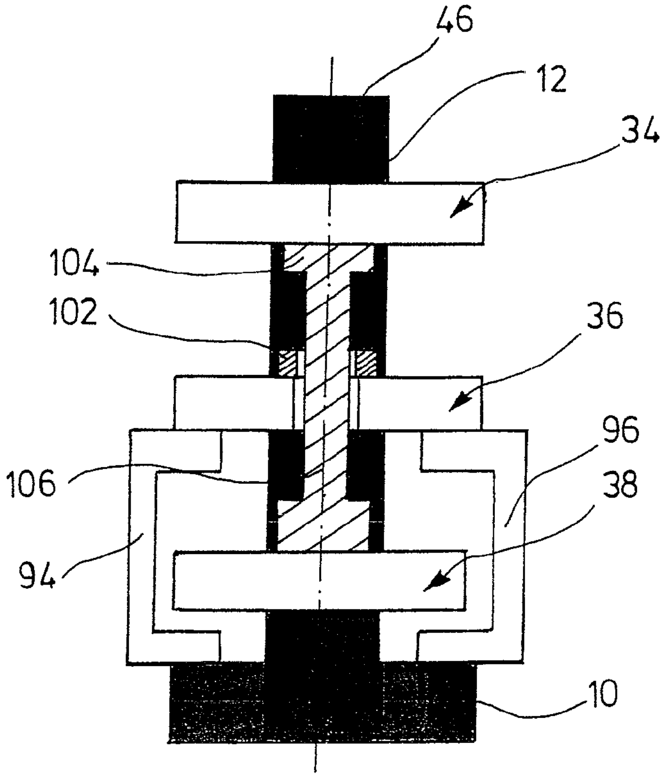
FIG. 8 shows a view of the schematic assembly of FIG. 7 in the direction of arrow 8.

The assembly of FIGS. 1 and 2 is outlined schematically in FIGS. 7 and 8. Again, components which are identical in FIGS. 7 and 8 are given identical reference numbers in FIG. 1. Furthermore, it is possible to recognize a die 102 on the die retainer plate 36, an upper ram 104 on the upper retainer plate 34, and a lower ram 106 on the lower retainer plate 38. The upper and lower rams 104, 104 cooperate with the die 102.

The compression tools are illustrated in a referencing position in FIGS. 7 and 8 where the upper edge of the die 103 is relevant for referencing. Referencing locates the point of origin of the system. Further tool components are referred to this point of origin. The thermal reference plane is the mounting plane of the die 102, i.e. the upper side of the die retainer plate 36 with which the measuring carriage 50 cooperates. In this plane, the graduated strip 47 is fixed to the column 12 at 108, i.e. in this plane only.

A measurement of tool positions is not possible directly, but via the retainer plates 34 to 38 as was mentioned before. Hence, this also requires to incorporate the temperature which is measured during referencing. A measurement of temperature takes place at the points designated "T", i.e. at the retainer plates 34 to 38, upper ram 104 and lower ram 106, and in the die 102 as well. Therefore, when measuring positions across the tool lengths 1 in operation, it is also necessary to incorporate the value determined for the temperatures which are measured. Furthermore, variations in length will occur if compression forces act and are measured by means of load cells, sensors and the like. Such values also have to be taken into account for a correction of the respective tool positions.

To allow the implementation of the operations described, a computer is needed to which the signal values measured by the graduated strip 47 as well as the temperature and force values may be inputted in order to calculate the respective actual lengths 1 for a determination of the position.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A press for the manufacture of dimensionally stable compacts from powdered material, characterized by the features of a press frame having vertically adjustable columns (56) and cross-connections, a die retainer plate (36), at least one upper ram retaining plate (34), at least one lower ram retaining plate (38, 40), a guide column (12) outside a press main axis which has two parallel guideways on which all retainer plates (34 to 40) are adapted to be guided vertically on one side or be selectively locatable, wherein the lower end of the guide column (12) is fixedly coupled to a frame-mounted lower plate (10) and the upper end is located on the press frame, an upper adjustable drive (74) adapted to be located on the press frame, for the upper retaining plate (34), a lower adjustable drive (68) for the lower retaining plate (38, 40) and the die retainer plate, if desired, and which is fixed to the frame-mounted lower plate (10).

2. The press according to claim 1, characterized in that the upper end of the guide column (12) is located on the press frame only in a horizontal direction.

3. The press according to claim 1, characterized in that the guideways are defined by guide rails (14, 16) which preferably are of a dovetailed cross-section and are attached to the one-piece guide column (12) and guide carriages (18 to 32) with which a retaining plate (34 to 40) each interacts are guided on the guide rails (14, 16).

4. The press according to claim 1, characterized in that the upper adjustable drive (7) is seated positively in an upper bearing plate (72) which, in turn, is bolted to an upper connection plate (58) of the press frame, the upper end of the guide column (12) has coupled thereto a horizontal aligning plate (46), the bearing plate (72) and aligning plate (46) are adapted to be located horizontally with respect to each other by a positive-fit connection, the lower adjustable drive (68) is seated positively in a lower bearing plate (10) and the guide column (12) is supported on the bearing plate (10), and the upper bearing plate (72) and aligning plate (46) have at least one pair of bores (48, 76) adapted to be aligned to each other, for the reception of an alignment pin (78).

5. The press according to claim 1, characterized in that the lower ram retaining plate (38, 40) has through openings (42, 44) for the selective passage of force-transmitting elements (80, 82, 84, 86) between the lower adjustable drive (68) and die retainer plate (36) and an upper one of two lower ram retainer plates (38), respectively.

6. The press according to claim 1, characterized in that the opposed sides of the retainer plates (34 to 40) has supported thereon supporting columns (94, 96) rotatably within the press frame or on the bearing plate (10) which, at the upper end, have laterally overhanging supporting portions (98, 100) which selectively can be pivoted below the die retainer plate (36) by rotating the supporting column about the vertical axis.

7. The press according to claim 6, characterized in that the height of the supporting portions (98, 100) is variable.

8. The press according to claim 1, characterized in that the stand columns (56) span over a rectangle, preferably a square, and the guide column (12) is disposed in a corner area of the rectangle or square at the inside of an associated stand column (6).

9. The press according to claim 1, characterized in that a single graduated strip (47) is mounted on the guide column (12) and the number of measuring carriages (48 to 54) which interact with the graduated strip matches the number of retainer plates (34 to 40).

10. The press according to claim 9, characterized in that the graduated strip (47) is mounted only in one reference plane for the pressing tools (102, 104, 106).

11. The press according to claim 10, characterized in that the reference plane is defined by the upper edge of a die clamped on the die retainer plate (36) or the clamping plane of the die retainer plate (36).

12. The press according to claim 1, characterized in that the upper and/or the lower adjustable drive is a hydraulic drive.

13. The press according to claim 1, characterized in that the upper and/or the lower adjustable drive is a linear electric drive.

* * * * *